No. 616,627. Patented Dec. 27, 1898.
W. C. McKEOWN.
TESTING APPARATUS.
(Application filed Sept. 29, 1898.)
(No Model.)
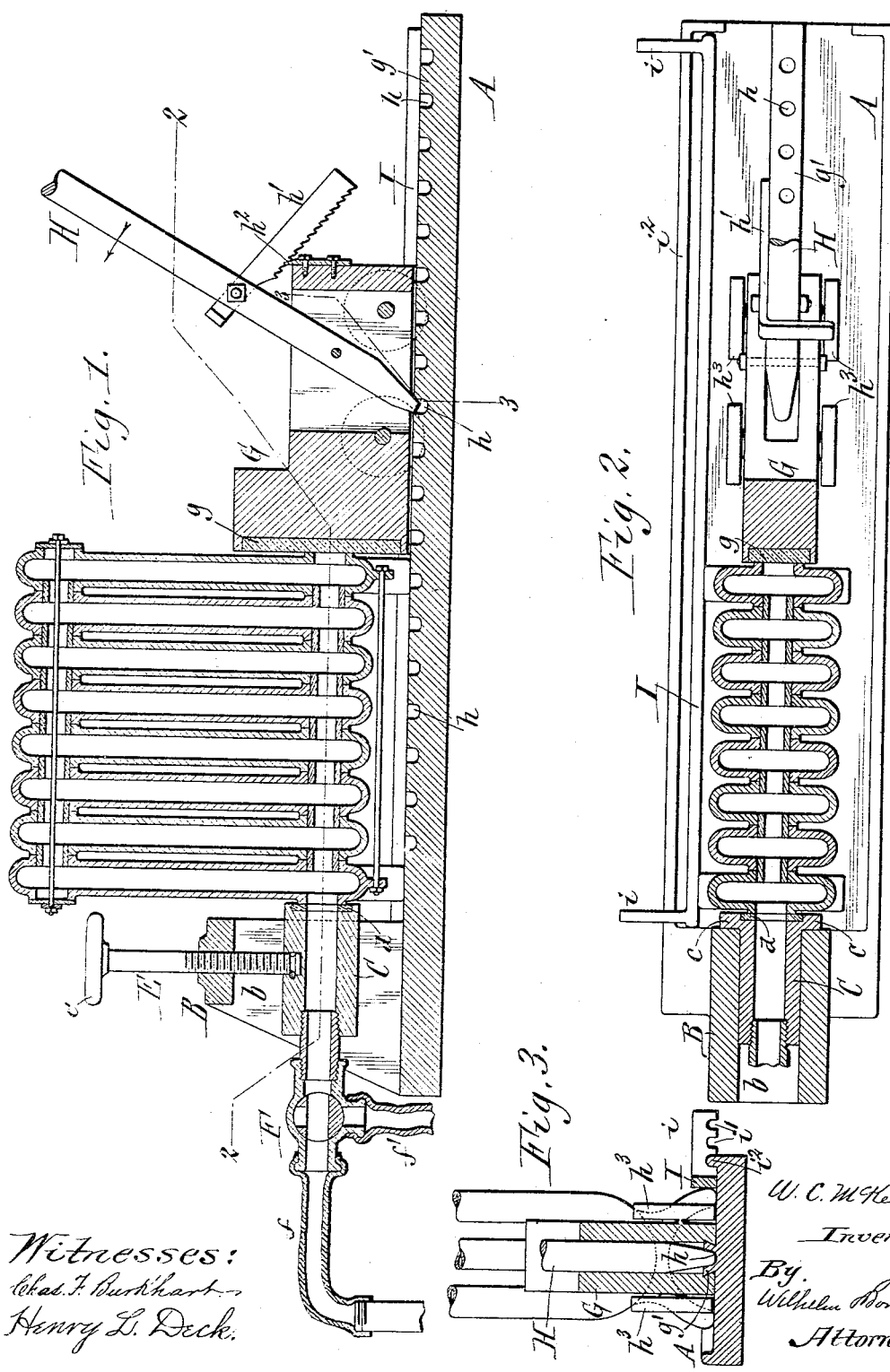

UNITED STATES PATENT OFFICE.

WILLIAM C. McKEOWN, OF BUFFALO, NEW YORK, ASSIGNOR TO THE STANDARD RADIATOR MANUFACTURING COMPANY, OF SAME PLACE.

TESTING APPARATUS.

SPECIFICATION forming part of Letters Patent No. 616,627, dated December 27, 1898.

Application filed September 29, 1898. Serial No. 692,185. (No model.)

*To all whom it may concern:*

Be it known that I, WILLIAM C. McKEOWN, a citizen of the United States, residing at Buffalo, in the county of Erie and State of New York, have invented new and useful Improvements in Testing Apparatus, of which the following is a specification.

This invention relates to a testing apparatus which is more particularly designed for testing radiators after the same have been assembled in order to detect any leaks in the same.

The object of my invention is to provide a testing apparatus for this purpose which is simple and durable in construction and whereby radiators and similar articles of different sizes can be quickly and conveniently tested.

In the accompanying drawings, Figure 1 is a vertical longitudinal section of my improved testing apparatus. Fig. 2 is a horizontal section in line 2 2, Fig. 1. Fig. 3 is a fragmentary vertical transverse section in line 3 3, Fig. 1.

Like letters of reference refer to like parts in the several figures.

A represents the base of the testing apparatus, which has the form of a horizontal elongated plate and upon which the radiator to be tested rests with its feet. One end of the base is provided with a standard B, having a vertical slot $b$ extending lengthwise through the same.

C represents a hollow or tubular abutment-block, against which one end of the radiator bears while being tested and whereby the testing fluid is conducted to the radiator. This tubular abutment-block fits between the upright side pieces of the standard and is held against outward movement in the standard by lugs or shoulders $c\ c$, arranged on opposite sides of the inner end of the abutment-block and bearing against the inner vertical face of the standard, as shown in Fig. 2.

The radiator to be tested is placed with one of its end hubs or nipples against the block, so that the nipple communicates with the bore of the block. Leakage is prevented at the joint between these parts by a rubber packing-ring $d$, which is arranged in the abutment around the inner end of the passage therein and against which the nipple of the radiator bears.

The distance from the bottom of the radiator to the nipple varies in different styles or patterns of radiators, and in order to adapt the apparatus for testing radiators in which the location or height of the nipples varies the slot or space in the standard is made so high that the abutment-block can be raised or lowered in the standard to register with the nipples of the radiators. This vertical adjustment of the tubular abutment-block may be effected by any suitable means, the means shown in the drawings consisting of a vertical adjusting-screw E, arranged in the top of the standard and provided at its upper end with a hand-wheel $e$, while its lower end is connected with the abutment-block, so that the latter is compelled to rise and fall with the screw.

F represents a three-way cock which is attached to the outer end of the tubular abutment-block, so as to supply the testing liquid thereto or allow the liquid to escape therefrom. $f$ represents the pressure-pipe, which is connected with the inlet-passage of this cock, and $f'$ the waste or drain pipe, which is connected with the drain-orifice of the cock. Both of these pipes are flexible in order to follow the adjustment of the block.

G represents a follower whereby the radiator is firmly pressed against the hollow abutment-block and held in place and whereby the rear hub or nipple of the radiator is closed during the testing operation. The front face of this follower presses against the rear nipple of the radiator, and in order to tightly close this nipple while testing the radiator the front face of the follower is provided with a packing or facing $g$ of rubber, which is of sufficient extent to close the nipples of the different radiators for the testing of which the apparatus is designed. The follower is guided so as to be capable of longitudinal movement on the rear portion of the base by means of a dovetail or undercut rib or rail $g'$, arranged lengthwise and centrally on the upper side of the base and engaging with a correspondingly-shaped groove in the under side of the follower. The follower is operated by an upright shifting lever H, which is arranged in a central opening in the follower and pivoted to the latter and which engages with its lower end in one of a longitudinal row of openings or recesses $h$ in the central rail of the base. Upon engaging the lower end of the shifting lever with one of the openings in the rail and then moving the upper end of the lever forwardly in the direction of the arrow in Fig. 1 the follower is pressed against the rear nipple of the radiator and the front nipple thereof is pressed against the hollow abutment. The shifting lever is held in its tightened position by means of a toothed detent-bar $h'$, which is pivoted to the lever and engages with a catch or shoulder $h^2$ on the follower. The longitudinal movement of the follower on the base is preferably facilitated by means of rollers $h^3$, arranged on opposite sides of the follower.

I represents a gage whereby the operator is guided in placing the radiators on the base, so that its nipples are in alinement with the abutment and follower. This gage consists of a longitudinal bar, which rests on one side of the base and against which the feet of the radiator are placed for alining the latter. This gage is capable of lateral adjustment to adapt it to radiators of different widths. For this purpose the gage-bar is provided near its ends with laterally-extending arms $i$, each of which is provided in its under side with a number of equidistant notches $i'$, one of which is engaged with the adjacent marginal rib or projection $i^2$ of the base. The location of the notches in the arms is such that by engaging one or another pair of notches with the base the gage is placed in the proper position for one or another size of radiators. The gage is held in this position by the arms without requiring any fastening.

For testing a radiator the latter is placed upon the base with its feet bearing at one side against the side gage and with its front nipple bearing against the hollow abutment-block. The follower is then forced against the rear nipple by the shifting lever and the latter is held by the detent-bar, so as to firmly close the rear nipple and produce a tight joint between the front nipple and the abutment-block. The cock F is now turned into the position shown in Fig. 1, in which the water or other liquid under pressure enters the radiator for testing the joints between the several radiator loops or sections, the radiator being provided with the usual air-cock for allowing the air to escape in admitting the water and allowing the air to enter in drawing off the water. After the radiater has been tested the cock F is turned so that the radiator is cut off from the pressure-pipe and connected with the waste-pipe, whereby the liquid in the radiator is permitted to drain off. The detent-bar is now disengaged from the shoulder of the follower, the lever is turned for disengaging the follower from the radiator, and the latter is removed.

In the use of this testing apparatus no fittings are applied to the radiator, as heretofore practiced, thereby enabling the testing of radiators to proceed expeditiously, and no fittings are required to adapt the apparatus to different sizes of radiators, as the apparatus can be readily adjusted to suit various sizes of radiators.

I claim as my invention—

1. The combination with the base adapted to support the hollow article to be tested and provided at one end with a standard, of a hollow abutment-block capable of vertical adjustment in said standard and adapted to communicate with the interior of said hollow article, and a follower capable of adjustment toward and from said abutment-block and adapted to bear against the opposite end of said article, substantially as set forth.

2. The combination with the base adapted to support the hollow article to be tested and provided at one end with a standard, of a hollow abutment-block capable of vertical adjustment in said standard and adapted to communicate with the interior of said hollow article, a vertical adjusting-screw arranged in said standard and connected with said block and a follower capable of adjustment toward and from said abutment and adapted to bear against the opposite end of said article, substantially as set forth.

3. The combination with the base adapted to support the hollow article to be tested and provided at one end with a standard, of a hollow abutment-block capable of vertical adjustment in said standard and adapted to communicate with the interior of said hollow article, a three-way cock attached to said hollow block and connected with a pressure-pipe and a drain-pipe, and a follower adapted to bear against the opposite end of said article, substantially as set forth.

4. The combination with the base adapted to support the hollow article to be tested, of a hollow abutment-block adapted to bear against said article and to deliver a pressure fluid into the same, a follower bearing against the opposite end of said article and guided on the base toward and from the abutment-block, a shifting lever pivoted on the follower and engaging with one of a longitudinal row of notches in the base, and a detent device whereby the lever is held in its tightened position, substantially as set forth.

5. The combination with the base adapted to support the hollow article to be tested, of a hollow abutment-block adapted to bear against one end of said article and to deliver a pressure fluid into the same, a follower bearing against the opposite end of said article and guided on the base by means of an undercut rail on the base engaging with a correspondingly-shaped groove in the follower, a shifting lever pivoted on the follower and engaging with one of a longitudinal row of notches in the base and a toothed detent-bar attached to the shifting lever and engaging with a shoulder on the follower, substantially as set forth.

6. The combination with the base adapted to support the hollow article to be tested, of a hollow abutment-block adapted to bear against one end of said article and to deliver the fluid into the same, a follower mounted on the base and adapted to bear against the opposite end of said article, and a gage arranged on the base on one side of said abutment-block and follower and adapted to aline the orifices of the article with said abutment-block and follower, substantially as set forth.

7. The combination with the base adapted to support the hollow article to be tested, of a hollow abutment-block adapted to bear against one end of said article and to deliver the fluid into the same, a follower mounted on the base and adapted to bear against the opposite end of said article, and a side gage capable of transverse adjustment on the base by means of arms connected with the gage and provided with notches which are engaged with a rib or projection on the base, substantially as set forth.

Witness my hand this 19th day of September, 1898.

WILLIAM C. McKEOWN.

Witnesses:
   THEO. L. POPP,
   JNO. J. BONNER.